M. J. SMITH.
Churn Dasher.
No. 50,851. Patented Nov. 7, 1865.
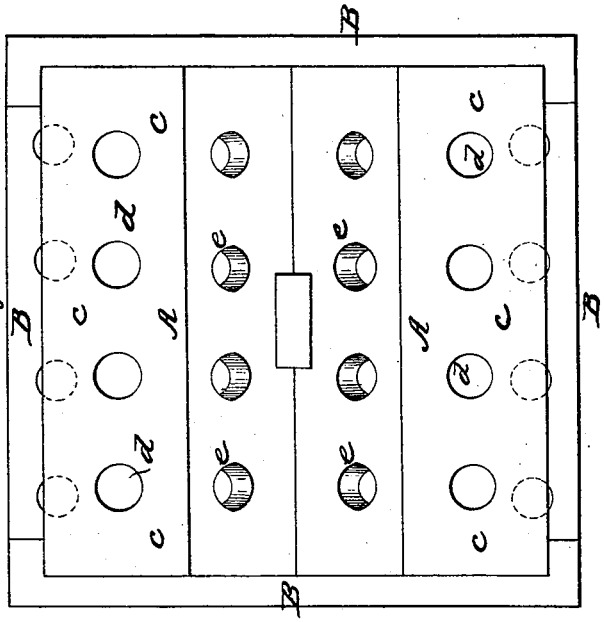
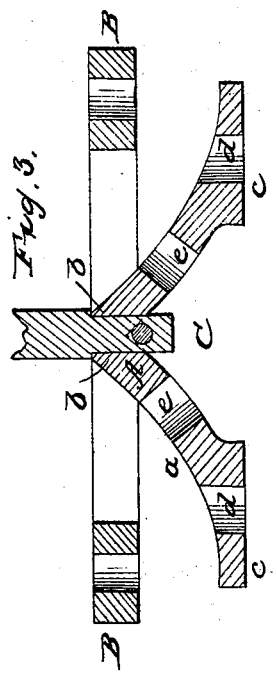
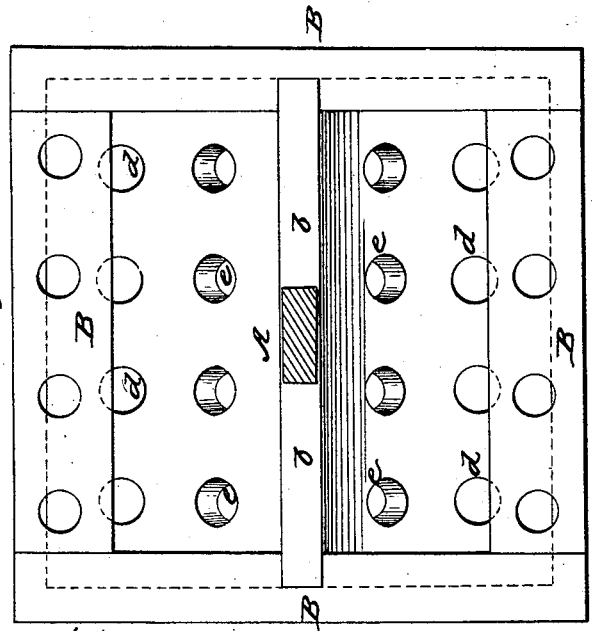

UNITED STATES PATENT OFFICE.

MILTON J. SMITH, OF DANSVILLE, NEW YORK.

IMPROVEMENT IN CHURN-DASHERS.

Specification forming part of Letters Patent No. 50,851, dated November 7, 1865.

*To all whom it may concern:*

Be it known that I, MILTON J. SMITH, of Dansville, Livingston county, State of New York, have invented a new and Improved Churn-Dasher; and I do hereby declare that the following is a full, clear, and exact description thereof, reference being had to the accompanying drawings, making a part of this specification, in which—

Figure 1 is a top view of the dasher. Fig. 2 is a bottom view of the same. Fig. 3 is a vertical cross-section.

Similar letters of reference indicate corresponding parts in the three figures.

This invention consists in combining with an inverted-trough-shaped dasher a rectangular frame, which latter, together with the inverted trough, are perforated in such manner that opposing currents of the milk or cream are brought violently in contact with each other, and a thorough agitation and aeration of the milk in the churn is effected, as will be hereinafter described.

To enable others skilled in the art to understand my invention, I will describe its construction and operation.

The body of the dasher consists of an inverted trough, A, having inclined concave sides $a\ a$, terminating at their highest point in a ridge, $b$, which extends from end to end of the trough, as shown in Fig. 1. On each side of the central channel, C, of the trough A the sides or wings $a\ a$ terminate in flat horizontal surfaces, $c\ c$, and through these portions vertical holes $d\ d$ are made. Between the rows of vertical perforations $d\ d$ and the ridge $b$ are rows of inclined perforations $e\ e$, which are intended for directing the currents of milk or cream in the churn-box upward and outward, as indicated by the arrows in Fig. 3, when the dasher is forcibly depressed; and these currents meet others which flow through the vertical holes $d\ d$, at a point which is some distance above the surface of the dasher A, and are thus broken. When the dasher ascends the currents of milk are caused to flow in reverse directions to those above mentioned.

B represents a horizontal rectangular frame, which consists of four narrow bars, secured together at their ends and suitably perforated to admit of the passage of the milk through them. This frame is secured to the ends of the body of the dasher in a horizontal plane with the ridge $b$, and it is intended to assist in breaking up the ascending currents which escape through the perforations $d$ and $e$, and also to compel the milk to flow inward from the sides of the churn-box. The frame B is somewhat larger than the body of the dasher, and it works within a rectangular churn-box, so as to serve as a guide as well as a part of the dasher. For this reason the milk which cannot pass through the perforations which are made through the bars of the frame B will be forced toward the center of the churn and be received upon the inclined surfaces $a\ a$, which will cause the milk to flow outward again and direct it forcibly against the sides of the churn.

When the dasher descends a large quantity of air will be collected in the channel, C, which will be intimately mixed with the milk as it is forced out through the perforations $d$ and $e$, and through the openings at the ends of the channel. By this means air is carried beneath the surface of the milk and mixed with it at every downward stroke of the dasher.

Having thus described my invention, what I claim as new, and desire to secure by Letters Patent, is—

1. The combination of the perforated and inverted-trough-shaped portion A with the elevated frame B, constructed to operrate substantially as described.

2. The construction of the portion A with concave sides $a\ a$, having perforations $d$ and $e$ through them, substantially as described.

MILTON J. SMITH.

In presence of—
O. TRUSEY,
M. S. DAVIS.